F. W. TILTON.
Grain-Drill.
No. 64,723.  Patented May 14, 1867.
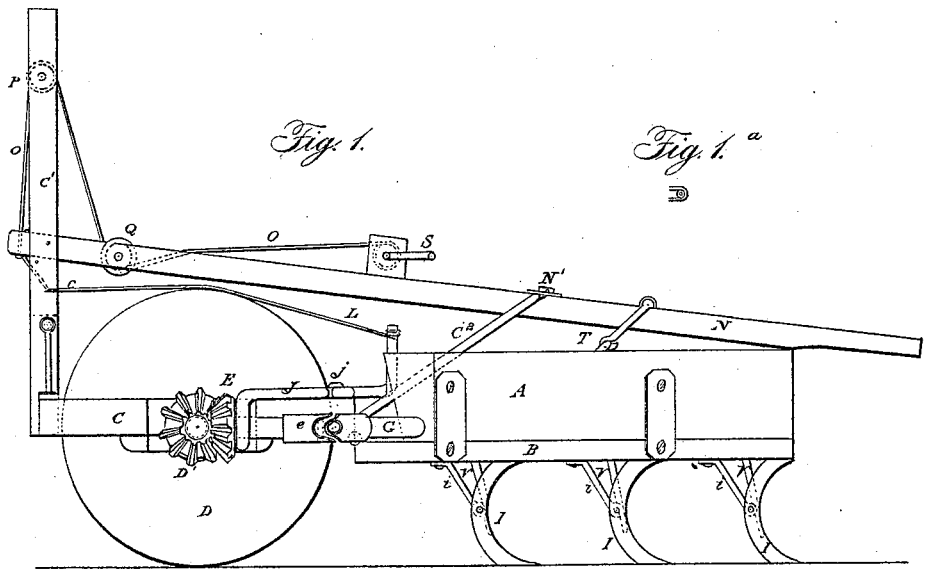
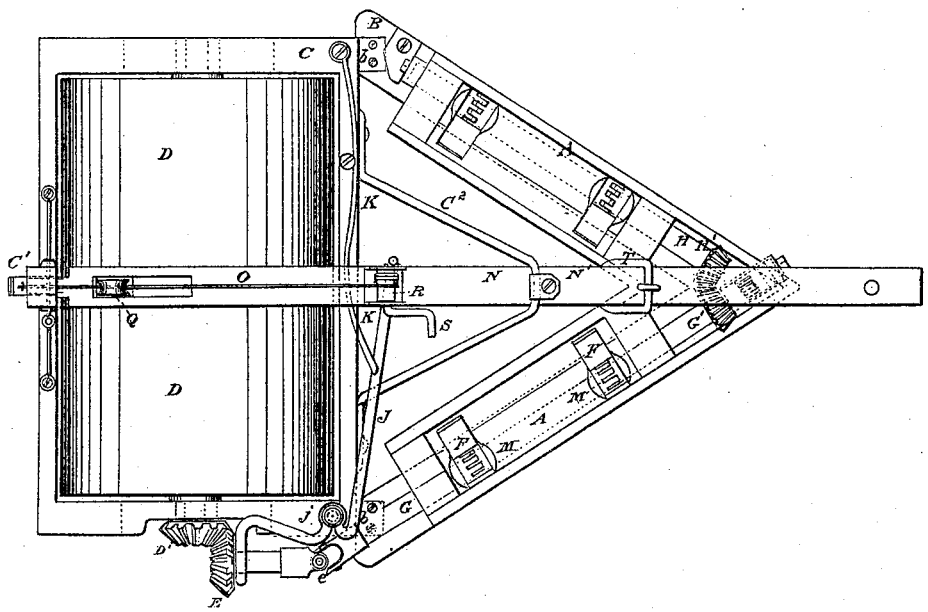
Witnesses:
D. W. Stetson
W. C. Dey
Inventor:
F. W. Tilton
by his attorney
Thomas J. Stetson

United States Patent Office.

FREDERICK W. TILTON, OF BRISTOL STATION, ILLINOIS.

Letters Patent No. 64,723, dated May 14, 1867.

---

IMPROVEMENT IN COMBINED SEEDER AND CULTIVATOR.

---

The Schedule referred to in these Letters Patent and making part of the same.

---

TO ALL WHOM IT MAY CONCERN:

Be it known that I, F. W. TILTON, of Bristol Station, in the county of Kendall, in the State of Illinois, have invented certain new and useful improvements in Agricultural Machinery for cultivating, drilling, and rolling; and I do hereby declare that the following is a full and exact description thereof.

I will first describe what I consider the best means of carrying out my invention, and will afterwards designate the points which I believe to be new. The accompanying drawings form a part of this specification.

Figure 1 is a side elevation of the entire machine, and

Figure 2 is a plan view of the same.

Figure 1ᵃ is a horizontal section of one of the teeth.

Similar letters of reference indicate like parts in all the figures. Tints are employed merely to aid in distinguishing parts, and do not indicate material. The material may be of wood and iron.

A A are boxes arranged to receive the seed, and mounted upon the framing B. This framing is connected by the hinges $b$ to the rectangular framing C, which contains the bearings for a cylindrical roller, D. This roller supports the weight of the main part of the machine when in use, and gives motion to the bevel gear-wheel D', which meshes into the bevel gear-wheel E, and thus, by the aid of the universal joint $e$, turns the shaft G, which presents several series of cavities, M, in the interior of the seed-box to receive the seed and measure it out by carrying the cavities past the cut-off F. Near the forward end of the shaft G is a bevel gear-wheel, G', which meshes into a corresponding shaped wheel, H', on a corresponding shaft, H, which is carried in the box A, on the other side of the framing, and performs on that side of the machine the same functions of measuring off and discharging the seed downward in regular quantities, as are performed by the corresponding parts just described on the right-hand side of the machine. The quantities of seed thus measured off by the rotation of the parts carrying the several seed-receiving cavities M are thrown down into the hollow interior of the peculiarly-shaped teeth I, which are formed of thin steel or other suitable thin material adapted to withstand the strains to which they are to be subjected in passing through the earth, which is, of course, understood to have been previously mellowed by ploughing or the like. These teeth I are curved both in elevation and in section, and are braced by arms $i$, which extend obliquely upward and rearward from a point at about the centre of the head of each tooth and are fixed to the framing as represented. V are tubes which lead the seed downward on their discharge from the cavities M, the lower ends of which are just sufficiently above the bases of the several teeth I, within which they are located, to allow the seed to scatter properly on the bottom of the furrow formed by the tooth, and to prevent the clogging of the lower ends of the tubes by dirt. The flaring bottom of the teeth I performs the ordinary function of forming a suitable flat-bottomed furrow in which the seed may be slightly spread, and the curved form of the tooth in the vertical plane allows the lower part to act efficiently both as a cultivator tooth and as a drill tooth, while the upper portion pitches sufficiently forward to prevent stalks or similar substances from accumulating. There is no acute angle formed in front at the junction of the tooth with the framing B. I can form these teeth of thin metal by swaging the material when hot, and the teeth are lighter and afford a more capacious channel for the descent and distribution of the seeds at the bottom than in any of the ordinary varieties of teeth. J is a bell-crank lever, turning on the pivot $j$, and pressed forward by the spring $k$, arranged as represented. L is a cord attached to the lever J, and passing under the pin $c$ in the upright framing C¹, which is carried on the rear of the frame C. This upright C¹ is slotted, as represented, and receives the rear end of the longitudinal frame N, to which the cord L is attached. Another cord, O, is attached to the same frame, N, and passes up over the pulley P, and thence down under the pulley Q in the frame N, and terminates in a windlass, R, which is mounted in bearings on the same frame N, and is provided with a crank, S. C² is a stout brace, firmly fixed on the front of the frame C and turning in a notch on the upper side of the framing N. It is held down in that notch by the cover N'. T is a brace mounted within the angular framing B, and connected by flexible links to the frame N, near its forward end, as represented. Turning the crank S shortens the cord O and elevates the rear end of the frame N. One effect of this movement is also to shorten the cord L and draw back the bell-crank lever J. This movement throws the gear-wheel F out of connection with the gear-wheel D'. Another effect is to elevate the forward edge of the framing C and to correspondingly elevate the rear end of the framing B and its connections. The forward end of the framing B is supported by the connection T. The forward end of the framing N may be extended further than represented, and made to serve as a tongue, or it may be connected in any other convenient manner to the draught animal or animals.

In using my machine as a cultivator and roller alone, the gear-wheel E is disconnected from the gear-wheel D', so that the seeding devices are not operated. In this condition the teeth I perform the function simply of stirring up the earth, and the roller D smooths down the earth thus stirred. The roller further serves in this combination as a means of gauging the depth to which the teeth I may act on the earth. By turning the crank S in one direction or the other this depth may be gauged with all the nicety that may be desired, and may be varied at brief intervals at pleasure in running over the field. On supplying the boxes A with seed and allowing the gear-wheel E to connect with the gear-wheel D', the rotary motion of the roller D is communicated to the seeding devices, and the seeds are deposited in the bottoms of the furrows formed by the teeth I, which thus become drills, while the seeds are nicely covered by the action of the roller D.

In using my machine as a cultivator it should be used with the roller, as represented, when it is desired that the earth be left smooth, but when it is preferred to leave it in slight ridges the roller should be removed from the frame C and a pair of light wheels, not represented, should be put in its place, which will perform the duties of steadying the motion and gauging the depth of its action without smoothing or compressing but a small portion of the surface. I propose in some cases, when using the machine as a cultivator, to remove the front teeth. This adapts the machine, with the aid of the wheels, to straddle rows of corn or other growing plants, and to cultivate quite closely and safely on each side of such rows.

In using the machine as a drilling machine, the quantity of seed deposited in each drill can be regulated at will by a simple adjustment, and the parts are so constructed and arranged, as more specifically set forth in another application for patent which I have, that all the seed-measuring cavities on a shaft will be simultaneously and equally increased or diminished.

I will briefly describe the mechanism here. Each shaft G and H is a hollow sleeve and contains a movable shaft within it. The seed-receiving cavities M are formed partly in the parts which are fixed immovably on the outer shafts, and partly in the parts which are fixed on the inner shaft, and are adapted to slide endwise therewith as they may be adjusted by turning the nuts shown at the ends. I am able thereby, at a single operation, to uniformly enlarge or contract all the cavities on a shaft.

Having fully described my invention, what I claim as new, and desire to secure by Letters Patent, is as follows:

1. I claim the connected frames B and C, carrying the teeth I and roller D, in combination with the beam N and its connections, for adjusting the depth to which the teeth may operate, all substantially as and for the purpose herein set forth.

2. I claim, in combination with the roller D and framing B, the gearing D', E, and universal joint e, provided with the lever J and spring K for bringing the gearing into action with a yielding force, and allowing it to be thrown out of and into gear, substantially as and for the purpose herein specified.

3. I claim, in combination, the roller parts D C, the cultivator parts B I, and the drilling mechanism G M A, with their several connections, adapted to operate conjointly, substantially in the manner and for the purpose herein set forth.

FREDERICK W. TILTON.

Witnesses:
GEO. W. HARTWELL,
JOHN C. TAYLOR.